3,451,421
CONVERTIBLE MODULATING PRESSURE
REGULATOR
Reno L. Vicenzi, Riverside, and Elmer E. Wallace, Fullerton, Calif., assignors to Controls Company of America, Melrose Park, Ill., a corporation of Delaware
Filed July 22, 1966, Ser. No. 567,173
Int. Cl. F16k *31/165;* G05d *23/02*
U.S. Cl. 137—495                                                      6 Claims

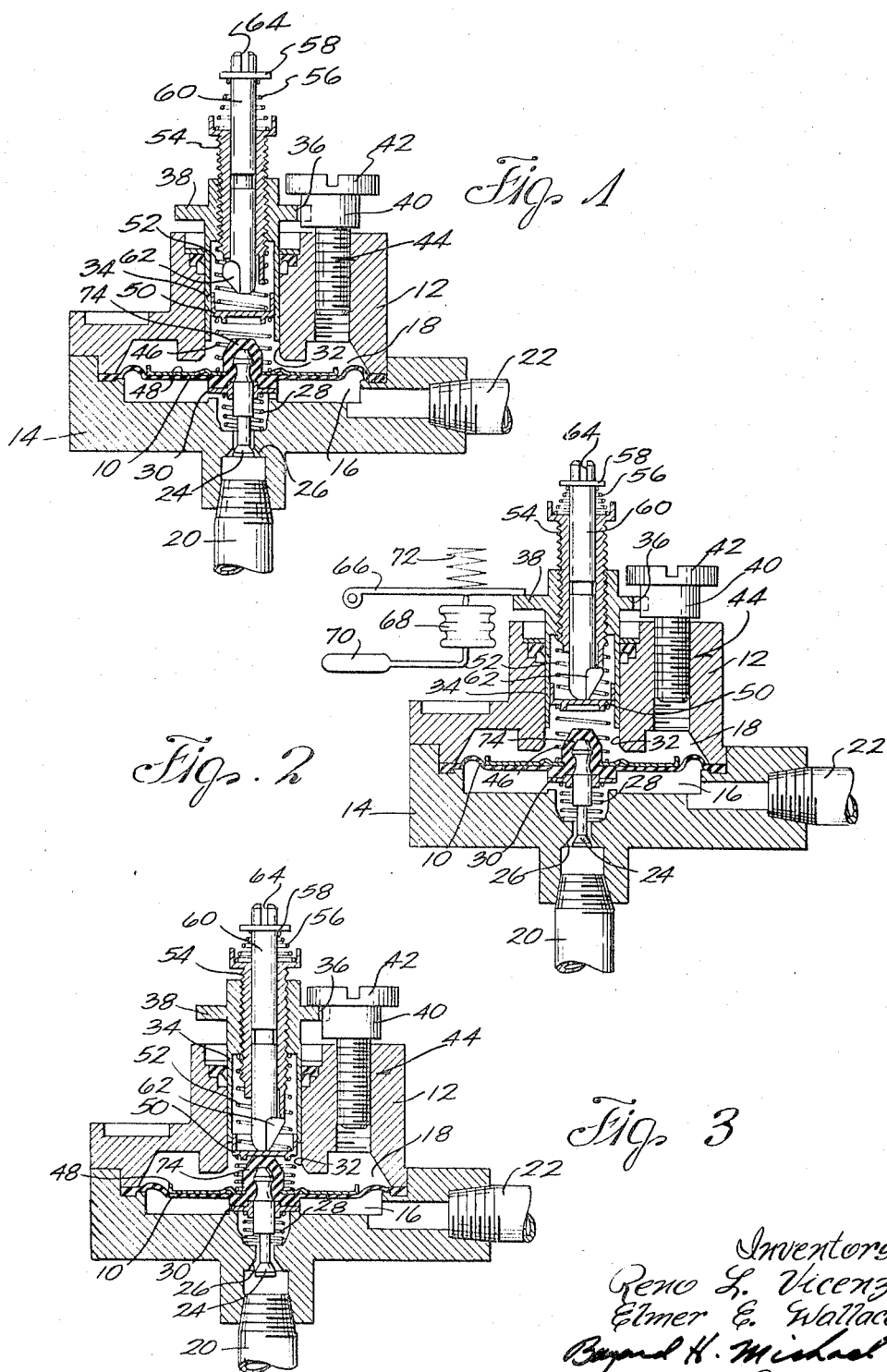

ABSTRACT OF THE DISCLOSURE

The pressure regulator provides for modulation through movement of the spring cylinder or sleeve within a range permitted by adjustment of the limit stop. In FIG. 1 the diaphragm is opposed by both springs whereas in FIG. 2 the regulated pressure has been increased by turning the lock stem to a lower position to render inoperative the upper weaker spring opposing the diaphragm. In FIG. 3 the lock stem has been moved down to remove both springs from operation and lock the diaphragm and the valve in the down position holding the valve open permitting unregulated passage a gas.

---

This invention relates to a gas pressure regulator which can be modulated to vary the regulated pressure and which can also be readily converted to handle any gas.

The principal object of this invention is to provide a gas pressure regulator which can be modulated and is easily converted to handle the available gas. It is old to provide a convertible gas pressure regulator and it is also old to provide for modulation of the regulated pressure but it is new to combine these features. The present structure is well suited for use in a bleed type gas valve where the regulator is in the bleed line and its operation controls operation of a main diaphragm valve—the latter following the former. Such a control is shown in U.S. Patent No. 2,247,060. The present disclosure shows the regulator and a schematic moduating control to simplify the showing and to demonstrate the separate utility of the arrangement.

Other objects and advantages will be pointed out in, or be apparent from, the specification and claims, as will obvious modifications of the single embodiment shown in the drawings, in which:

FIG. 1 shows the pressure regulator adjusted for manufactured gas;

FIG. 2 shows the conversion to natural gas and includes a thermostatic control for modulating the regulated pressure; and FIG. 3 shows the conversion of LP gas.

Diaphragm 10 is clamped between the upper and lower housings 12, 14 to define a lower or pressure chamber 16 and an upper chamber 18. The pressure chamber has an inlet 20 and an outlet 22 and flow therebetween is controlled by valve 24 carried by the diaphragm and cooperating with valve seat 26 to throttle flow as the diaphragm moves upwardly in response to increasing pressure in chamber 16. Light spring 28 compressed between the housing and the central boss 30 urges the valve in the closing direction. The upper housing is provided with a central opening 32 in which the cylindrical member 34 is slidably mounted. Cylinder 34 has a notch 36 in the periphery of flange 38 to cooperate with the enlarged shoulder 40 to prevent rotation of the cylinder. Flange 38 can contact the underside of screw head 42 of the adjusting screw 44.

Spring 46 is compressed between diaphragm pad 48 and flat seat 50 slidable inside cylinder 34. Upper spring 52 is compressed between seat 50 and the inside seat in the upper end of the cylinder 34 which has tubular adjuster 54 threaded therein. As shown in FIG. 1, pressure in chamber 16 is aided slightly by spring 28 while both springs 46 and 52 act in opposition. Therefore, the valve will be controlled to regulate pressure in chamber 16 at a value determined by both springs 46 and 52 and by the position of cylinder 34 which can be moved down to increase the loading on springs 46 and 52 and increase the regulated pressure. The low limit of regulated pressure can be set by adjusting screw head 42 which determines the upperward travel limit of the cylinder.

The upper end of the tubular adjuster 54 is cupped to serve as a seat for conical spring 56 which acts against the underside of ring 58 mounted on the upper end of lock pin 60 mounted inside adjuster 54. The lower end of pin 60 is slotted to receive the projecting spade 62 on the lower end of pin 60 as shown in FIG. 1 with the end of pin 60 just about flush with the lower end of adjuster 54. If the pin is pushed down and turned by means of the slot 64 the spade 62 can be engaged with a smaller slot in the end of adjuster 54 so the pin is retained in the depressed position as in FIG. 2. In this position seat 50 is held against the lower end of pin 60 by spring 46 and the upper spring 52 is rendered ineffective. In FIG. 1 the regulator is set for manufactured gas while in FIG. 2 it is set for natural gas, lower and higher regulated pressures, respectively.

With the FIG. 2 setting the low fire or low pressure setting is determined by adjusting adjuster 54 up or down to determine the minimum regulated pressure. The pressure (flow) can be modulated by moving cylinder 34 up or down as schematically shown in FIG. 2 where the end of pivoted lever 66 acts against cylinder flange 38 to position the cylinder. A bellows 68 expands as the ambient temperautre at feeler bulb 70 increases to move the lever up in opposition to return spring 72 to let the cylinder 34 rise to decrease the force of spring 46 and reduce the regulated pressure (or flow). The same arrangement can be used in FIG. 1.

If adjuster 54 is turned down to its extreme limit it will push the floating seat 50 down against the center stud 74 while moving flange 38 against stop 42 to hold valve 24 open. In this position the pressure regulator is rendered ineffective. When the pressure regulator is incorporated in a control which may be used with various gases including LP (liquefied petroleum) gas the regulator would be positioned as shown in FIG. 3 to bypass the regulator which is not needed with LP gas since LP gas containers are provided with separate regulators.

Although but a single embodiment of the present invention has been illustrated and described, it will be apparent to those skilled in the art that various changes and modifications may be made therein without departing from the spirit of the invention or from the scope of the appended claims.

We claim:
1. A gas pressure regulator comprising:
 (a) a chambered housing having a diaphragm therein dividing the housing into two chambers,
 (b) an inlet to and an outlet from one of the chambers,
 (c) a valve carried by the diaphragm and controlling flow through the inlet in accordance with movement of the diaphragm as influenced by pressure in said one chamber,
 (d) a pair of springs acting on the diaphragm in opposition to the pressure in said one chamber,
 (e) means operable to disable one of the springs,
 (f) means operable to hold the valve open under all pressure conditions in said one chamber,

(g) a movable support for said springs permitting the variation of the spring force acting on the diaphragm to vary the regulated pressure, (h) an adjustable limit stop for the support to determine the low pressure limit of the regulator when both springs are operative; and (i) means operative when said one spring is disabled to modify the low pressure limit determined by said limit stop.

2. A regulator according to claim 1:

in which the means for modifying the low pressure limit and the means for holding the valve open are the same means and the valve open position is an extreme adjustment for rendering the pressure regulator inoperative when used with a regulated gas supply.

3. A pressure regulator comprising:

a housing having a chamber therein and a diaphragm forming one wall of the chamber, an inlet to and an outlet from the chamber, a valve carried by the diaphragm and controlling flow through the inlet in accordance with the pressure in the chamber, a pair of springs acting on the diaphragm in opposition to the pressure in the chamber, spring support means for the springs, said support means being movable to vary the loading of the springs to vary the pressure maintained by the regulator, means operable to disable one of the springs to change the pressure range of the regualtor, an adjustable limit stop for the support means to determine the low pressure limit of the regulator when both springs are effective, said support means being limited by said limit stop when one or both springs are effective, and means interposed between the other of said springs and said limit stop to adjust the minimum force of said other spring when said one spring is ineffective.

4. A regulator according to claim 3:

in which the means interposed between said other spring and the limit stop is adjustable to an extreme position in which the valve is held open at all times.

5. A regulator according to claim 3:

in which the support means is a tubular carrier slidably mounted in the housing and projecting therefrom for actuation, said springs being arranged in series and said disabling means being mounted in the carrier and operative when effective to prevent compression of said one spring, said carrier being freely movable when one or both springs are effective.

6. A regulator according to claim 5:

in which said disabling means is connected to the carrier by means of an interposed adjuster operative to determine the minimum force of the other of the springs when said one spring is ineffective and the carrier is against said limit stop.

References Cited

UNITED STATES PATENTS

| 2,362,352 | 11/1944 | Buttner | 137—505.12 |
| 2,478,040 | 8/1949 | Campbell et al. | 137—505.42 |
| 2,599,577 | 6/1962 | Norgren | 137—505.18 XR |
| 2,625,954 | 1/1953 | Klein | 137—50.42 XR |
| 2,721,570 | 10/1955 | Caparone et al. | 137—495 XR |

M. CARY NELSON, *Primary Examiner.*

R. J. MILLER, *Assistant Examiner.*

U.S. Cl. X.R.

137—505.42; 236—92